CRANE & PEASE.
Solar Mirror for Photographic Purposes.
No. 54,118.   Patented April 24, 1866.
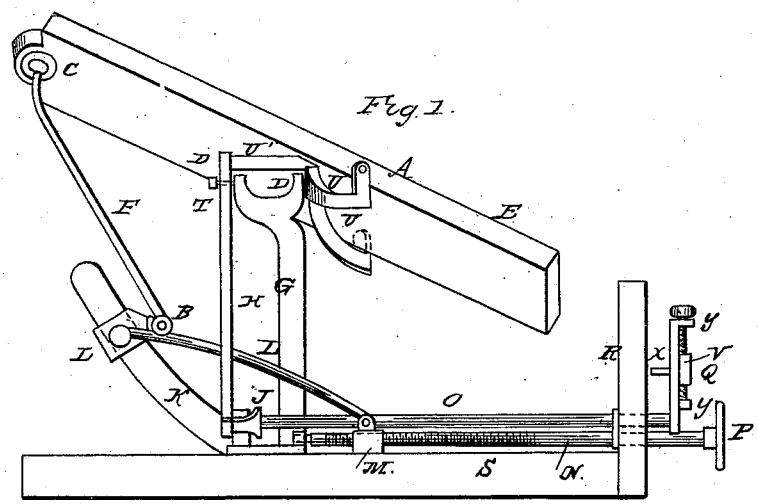
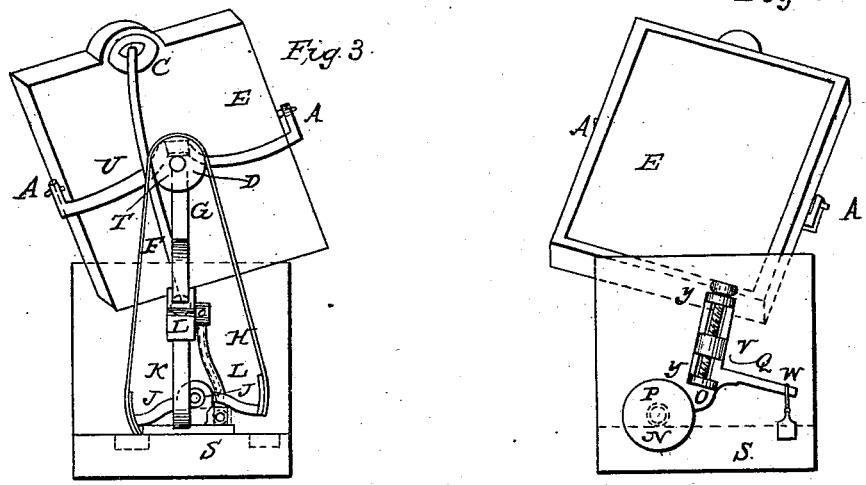

UNITED STATES PATENT OFFICE.

WM. CRANE AND WARREN H. PEASE, OF GOSHEN, INDIANA.

ARRANGEMENT OF SOLAR MIRROR FOR PHOTOGRAPHIC PURPOSES.

Specification forming part of Letters Patent No. 54,118, dated April 24, 1866; antedated April 16, 1866.

*To all whom it may concern:*

Be it known that we, WILLIAM CRANE and WARREN H. PEASE, of Goshen, in the county of Elkhart and State of Indiana, have invented a new and useful Improvement in Reflectors for Photographic Uses; and we do hereby declare that the following is a full, clear, and exact description thereof, which will enable others skilled in the art to make and use the same, reference being had to the accompanying drawings, forming part of this specification, in which—

Figure 1 is a side elevation of a reflector arranged according to our invention. Fig. 2 is front view. Fig. 3 is a back view.

Similar letters of reference indicate like parts.

The object of this invention is to make a mirror reflect a line of light in one direction from sunrise to sunset by means of clock-work or other moving power without requiring much attention from the attendant, so that large solar prints can be made sharp and clear with ease. In order to effect this object the mirror must follow the apparent track of the sun from day to day, whether the sun be low or high in its altitude; and this invention consists in means for accomplishing this result.

S designates a platform, which may be made to sustain the apparatus. From this platform rises a standard, G, which is provided with bearings on its top for the horizontal axis D, to which axis the back of the mirror E is connected by means of arms U, which extend beneath the mirror and are pivoted to its sides, so as to permit the mirror to vibrate between them. The arms U are united to the end of a horizontal bar, U', whose other end is fixed to the side of a pulley, T, near its periphery. The axis D D, made in this example in separate parts, but both parts being in the same horizontal plane, passes through the center of pulley T and through the place of meeting of the arms U U, and since the pulley and the arms are rigidly connected to each other by the bar U', it follows that any rotation of the pulley will cause a corresponding motion in the arms, and the mirror will be rotated about its longitudinal axis D. The parts T, U', and U perform the office of a cross-head to the mirror.

H is a metallic strap which passes over the pulley T and is connected by its ends to radial arms J, which extend in opposite directions from a horizontal rock-shaft, O, which we call the "time-rod." This time-rod is placed near to and parallel with the floor or platform S, and its outer end extends through the wall R of the apartment where the clock-work or other power that moves the apparatus is to be placed. Such clock-work is not here shown because it forms no part of our invention. To that end of the rod which reaches within the wall R we fix an upright bar, Q, having top and bottom flanges, *y y*, which hold the top and bottom of a screw which carries a traveling nut, V. The back part of the nut has a horizontal pin, *x*, which projects through a slot cut in the bar behind the screw, the length of the slot being equal to the length of the screw.

W is an arm projecting from the lower part of the bar Q, at one side thereof, and is meant to carry a weight which will tend constantly to tilt the mirror toward the right by rocking the shaft or time-rod O. The office of the clock-work or other power is to regulate the motion of the rock-shaft O and retain it by resisting the weight, and it is therefore to be connected to the bar Q by means of a rod extending from the clock to the pin *x* of the nut.

The mirror E is thus made capable, by the operation of the devices just described, of an oscillatory motion on its longitudinal axis. It remains to show how it can be made to vibrate on its transverse axis—that is to say, about the points of support A A of the arms U U. In the head of the mirror, on its back side, is a ball-and-socket joint, C, to which is connected a rod, F, whose lower end is connected at B by a universal joint to a cross-head, L, which slides on a curved arm or arc, K, that rises from behind the standard G. This arc is in the same plane with the axis D, so that whatever height may be given to the universal joint or axis B by the sliding of the cross-head L said axis will always be in the same vertical plane with the axis D. The cross-head is kept at whatever place on the arc it is moved to by the friction of a spring or other suitable device. The raising and lowering of the cross-head is effected through an arm, L, pivoted te one of its sides, said arm extending forward to a nut, M, working on a horizontal screw-rod, N, which is placed near the rock-shaft or time-rod O, and, like it, extends through the wall R, its inner end being provided with a button, P, to enable the operator to rotate the screw with ease and so raise or lower the cross-head, according to the inclination to be given to the mirror longitudinally.

In using the apparatus the camera-box is to rest on the top of the wall R and is to extend into the room toward the right. In making the mirror follow the course of the sun correctly it is necessary that it make half a revolution—that is, describe an arc of one hundred and eighty degrees—on its axis D during the time the sun is above the horizon, whether the solar day be nine or fifteen hours long. This requires a capacity of varying the speed of the rotation of the rock-shaft, which we accomplish by running the pin $x$ outward away from the shaft or inward toward it. Thus, on revolving the screw and moving the nut and its pin outward, we lengthen the radius of the crank-connections which the clock-work has with the shaft, and therefore the rotary movement of the shaft is delayed, and the converse is true when the nut is run down toward the center of motion.

It will be observed that the movement of the mirror is a compound one, made up of its rotation about its longitudinal axis D and of its rotation about its axis B. The inclination of the mirror in a longitudinal direction is varied to correspond with the altitude of the sun by means of the screw-rod N.

The same system of mechanism can be applied to the running by clock-work a camera exposed directly to the sun without the intervention of a mirror.

Having thus described our invention, we claim as new and desire to secure by Letters Patent—

1. The apparatus herein described for directing a line of light from sunrise to sunset, whatever the altitude of the sun may be, made and applied substantially as and for the purpose above set forth.

2. Retarding the speed of the movements of the rock-shaft O by means of the traveling nut V and its pin $x$, substantially as herein shown.

The above specification of our invention signed by us.

WILLIAM CRANE.
WARREN H. PEASE.

Witnesses:
L. G. JOHNSON,
F. L. CLARK.